No. 727,311. PATENTED MAY 5, 1903.
J. E. DOUGLAS & G. W. HAYS.
CYLINDER AND PISTON PACKING.
APPLICATION FILED AUG. 27, 1901. RENEWED AUG. 16, 1902.
NO MODEL.
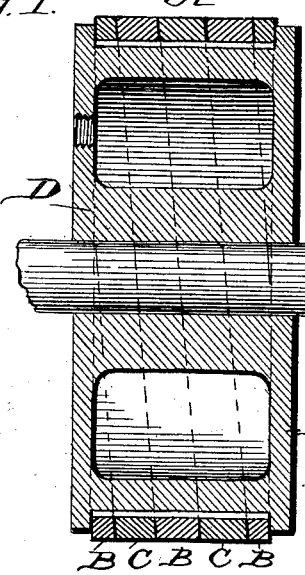
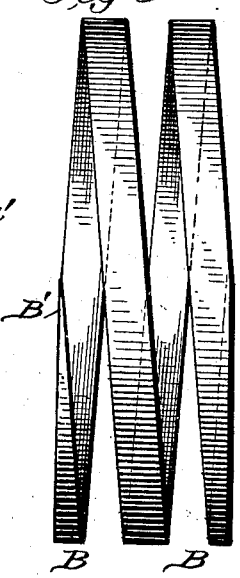
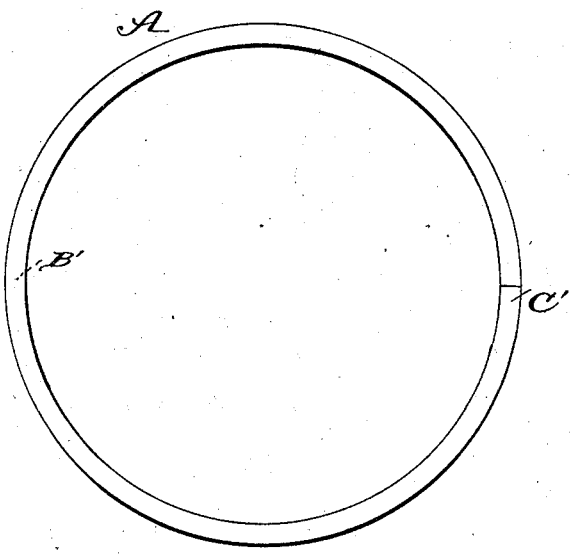
WITNESSES:
Jos. A. Ryan
Perry B. Turpin
INVENTORS
John E. Douglas
George W. Hays
BY Munn & Co.
ATTORNEYS No. 727,311. Patented May 5, 1903.

UNITED STATES PATENT OFFICE.

JOHN E. DOUGLAS, OF BIRMINGHAM, AND GEORGE W. HAYS, OF AVONDALE, ALABAMA.

CYLINDER AND PISTON PACKING.

SPECIFICATION forming part of Letters Patent No. 727,311, dated May 5, 1903.

Application filed August 27, 1901. Renewed August 16, 1902. Serial No. 119,916. (No model.)

*To all whom it may concern:*

Be it known that we, JOHN E. DOUGLAS, residing at Birmingham, and GEORGE WILLIS HAYS, residing at Avondale, in the county of Jefferson and State of Alabama, citizens of the United States, have made certain new and useful Improvements in Cylinder and Piston Packing, of which the following is a specification.

Our invention is an improvement in the packing of cylinders and pistons, having for an object to provide a simple, economical, durable, and effective packing which can be conveniently applied to pistons in course of construction and to those already in use; and the invention consists in certain novel constructions and combinations of parts, as will be hereinafter described and claimed.

In the drawings, Figure 1 is a sectional view of a piston provided with one form of our invention. Fig. 2 is a side view of double-spiral packing. Fig. 3 is a side view of one of the packing-sections, and Fig. 4 is a face view of the packing.

In carrying out our invention in its preferred form we construct the packing A of a plurality of sections B and C in the form of helical spring-coils, with the space between the adjacent coils of one section occupied by the coils of the other section, as will be understood from Fig. 2, and with the ends of the packing formed partly of each of the coils and squared off at right angles to the axes of the coils, as will be understood from Figs. 2 and 3, from which it will be noticed each of the coil-sections is brought, as shown at B' and C' in Fig. 2, with its face coinciding with the adjoining face of the other coil.

In fitting the sections B and C together to form a packing, as shown in Fig. 2, they are adjusted together by screw action, turning them within each other to the position of parts shown in Fig. 2, in which they will form a complete packing for the piston.

It will be understood that while we prefer the construction as shown in Fig. 1, we do not desire to be limited in the broad features of the invention to the specific construction shown in Figs. 1 and 2, as the invention has a broader scope and pertains to all forms of spiral-spring cylinder-packing consisting of a plurality of helical-coil sections fitted together and which may be made of any suitable material, principally of cast-iron, and the invention may be used in pistons of cylinders, engines, pumps, &c., the invention being specially adapted for use in marine engines and locomotives, as by it we secure economy in lubrication, durability, elasticity, and freedom from waste of steam, gas, air, or other fluid.

The invention may be used on solid or skeleton pistons or with followers and can be made to fit piston-heads already in use and will work equally well with or without casing.

In making the packing-sections the regular allowance for spring relative to the size of the cylinder should be made.

The piston-body D may be of any suitable form, that shown aiding in illustrating the packing as in use.

It will be understood that the coils are not fitted tightly together until in position in the cylinder, and in manufacturing the coils an adequate space is left between the sections to allow for the necessary contraction and expansion to fit the cylinder. It should also be understood that when the packing is fitted to the groove of the piston-head it will entirely fill such space longitudinally, the purpose being for the packing to expand or spring diametrically, so it will secure a proper fit. In this connection it will be noticed in Fig. 1 that there is a small space between the inner side of the coil and the body of the piston, which is provided to allow the adjustment of the coil on the piston-head when worn in the stuffing-box. On skeleton heads a ring may be used in this space to support the spirals, the space being made somewhat larger in such instance.

While we have shown the packing composed of two helical-spring-coil sections, it may be desirable in some instances to use as many as four sections, and in some cases only a single spiral may be employed.

In providing for the spring across the diameter of the coil packing for twelve-inch cylinders would be turned upon twelve and one-eighth inches and would be sprung into position by giving a spiral twist in inserting in the cylinder, so the packing will spring to the bore of the cylinder tightly and evenly all around.

An advantage in the use of the improved form of packing is that it provides a complete packing circle, and an especial advantage resulting from employing two or more coils is that thereby we avoid any longitudinal space in the packing, which would be liable in the operation of same to crystallize the coils and render them liable to break.

It may be desirable in some instances to cut the grooves or spaces between the coils the same width as the coils and to provide a larger space in the piston-head to allow for diametrical contraction of the spirals; but we prefer to allow sufficient space between the coils to enable the packing to freely enter the cylinder when in position on the piston-head.

By constructing the packing of two sections coiled correspondingly and with the coil of one section occupying the spaces between the coils of the other section we are able to provide a packing which when assembled, as shown in Fig. 2, will be free of any expansion or contraction in the direction of its axis and in which the expansion will be circumferentially or diametrically.

In the use of a packing comprising but a single coil it is necessary in order to true off the sides of the coils to employ a turning-tool of sufficient size to possess the necessary strength, and this necessitates the construction of the coil with its convolutions spaced apart a considerable distance, rendering it necessary to compress the coil in the direction of its axis to a very considerable extent in order to bring its coils in contact to form a suitable packing, as desired. This puts the packing under considerable tension in the direction of its axis and renders it very liable to be easily broken in use.

Having thus described our invention, what we claim as new, and desire to secure by Letters Patent, is—

1. A piston provided with a packing composed of a plurality of sections in the form of helical coils of equal diameter screwed together with the space between the coils of one section occupied by the coils of the other section and with the ends of the sections squared off at right angles to the axes of the sections, substantially as set forth.

2. A packing for pistons and the like, composed of a plurality of helical-spring-coil sections fitted together with the space between the coils of one section filled by the coils of the other section, substantially as set forth.

3. The piston herein described comprising the body and the packing applied thereto, and comprising a plurality of sections of equal diameter each composed of a helical coil, and with the space between the adjacent coils of one section occupied by the coils of the other section or sections and with the ends of the packing formed in part by several sections, substantially as set forth.

4. A packing consisting of two helical-spring-coil sections fitted together with the space between the coils of one section filled by the coils of the other section and with the ends of the two coils squared at a right angle to the axis of the coil and with the squared ends of the two coils coinciding to form flat ends for the packing, substantially as set forth.

5. A piston comprising the body and the packing applied thereto and composed of a plurality of helical coils fitted within each other with space between the coils of one section filled by the coils of the other section and held from longitudinal movement on the head and arranged to spring diametrically, substantially as set forth.

6. A packing-ring comprising a plurality of intertwined spirals.

7. A packing-ring comprising a plurality of intertwined metallic spiral hoops.

8. A packing-ring comprising an elastic spiral hoop having its spirals spaced apart, and a second elastic spiral hoop having its spirals occupying the space between the spirals of the first said hoop, the spirals so combined forming a continuous surface.

9. A packing-ring comprising a plurality of intertwined metallic spiral hoops, and means for retaining the spirals in their intertwined position.

10. In combination with a piston, of a packing therefor, such packing comprising an elastic spiral ring having its extremities tapered or feathered, a second similar spiral ring adapted to be intertwined with the first-mentioned spiral, and flanges on the piston for retaining the spirals in their intertwined position.

JOHN E. DOUGLAS.
GEORGE W. HAYS.

Witnesses:
T. B. ALFORD,
L. D. SCHWAB.